US008407663B2

(12) United States Patent
Mechelke et al.

(10) Patent No.: US 8,407,663 B2
(45) Date of Patent: Mar. 26, 2013

(54) UPGRADING SIMPLE APPLICATIONS TO FULL SCALE SOLUTIONS

(75) Inventors: Thomas Mechelke, Seattle, WA (US); Howard Crow, Sammamish, WA (US); Brad Stevenson, Seattle, WA (US); Thomas Gersten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1157 days.

(21) Appl. No.: 12/060,267

(22) Filed: Apr. 1, 2008

(65) Prior Publication Data

US 2009/0249280 A1 Oct. 1, 2009

(51) Int. Cl.
*G06F 9/44* (2006.01)
(52) U.S. Cl. .......................................... 717/102
(58) Field of Classification Search ................... None
See application file for complete search history.

(56) References Cited

U.S. PATENT DOCUMENTS

| | | | |
|---|---|---|---|
| 6,199,193 B1 * | 3/2001 | Oyagi et al. .................. 717/101 |
| 7,146,347 B1 * | 12/2006 | Vazquez et al. ................ 706/12 |
| 7,350,191 B1 * | 3/2008 | Kompella et al. ............. 717/108 |
| 2003/0083910 A1 | 5/2003 | Sayal et al. |
| 2003/0083915 A1 | 5/2003 | Guicciardi et al. |
| 2003/0200130 A1 | 10/2003 | Kall et al. |
| 2005/0080640 A1 | 4/2005 | Bhaskaran et al. |
| 2005/0096937 A1 | 5/2005 | Subash et al. |
| 2005/0160104 A1 * | 7/2005 | Meera et al. .................. 707/100 |
| 2006/0129978 A1 * | 6/2006 | Abrari et al. .................. 717/110 |
| 2007/0124373 A1 | 5/2007 | Chatterjee et al. |
| 2007/0156418 A1 | 7/2007 | Richter et al. |
| 2007/0179793 A1 | 8/2007 | Bagchi et al. |
| 2007/0240131 A1 * | 10/2007 | Sumerlin ...................... 717/139 |

FOREIGN PATENT DOCUMENTS

WO WO0138976 A1 5/2001

OTHER PUBLICATIONS

"Software Solution's Prototypes"; retrieved from: http://www.struktuur.ee/188038; retrieved on: Nov. 16, 2007; 1 page.
"Open Pro ERP Software Implementation Deployment Methods and Strategy", OpenPro.; retrieved from: http://www.openpro.com/implement8.html; retrieved on: Nov. 16, 2007; 3 pages.
Zykov, "Enterprise Portal: from Model to Implementation", Proceedings of the 6th International Workshop on Computer Science and Information Technologies, CSIT'2004, 2004.

* cited by examiner

*Primary Examiner* — Philip Wang

(57) ABSTRACT

The architecture provides development tools for the occasional developer to build a substantial portion of an application interface for accessing and interacting with actual data. The lack in knowledge of the occasional developer to complete the project is then supplemented by a development service provider such that experienced developers complete the interface and integrate the interface into the application environment so the occasional developer can use the application to access data for which the interface was developed. The architecture provides tools that are understandable for building in a guided way the framework and the user experience for the application, and then passes on the more complex pieces to IT because coding may be needed or a model should be generated that is scalable for a large number of users, for example. IT then completes the development process and integrates the final solution into the application environment.

19 Claims, 9 Drawing Sheets

UPGRADING SIMPLE APPLICATIONS TO FULL SCALE SOLUTIONS

BACKGROUND

Application development resources are scarce in many organizations. Moreover, business requirements for software solutions change much faster than the requirements can be addressed by development organizations. This tension oftentimes is resolved by business units building point solutions without the knowledge or involvement of central IT (information technology) which creates considerable risk for the data (e.g., PII (personally identifiable information) compliance concerns), as well as in most cases, a complete rewrite by central IT, should the business problem become a high enough priority to create a full scale solution. Even then, given current processes and long running projects, the business requirements often change between the initial requirements gathering phase and the final implementation putting both IT and the business unit in a position of perpetually playing catch-up. Typically, there is a fair amount of knowledge about the problem space in the business unit, but the business users do not have the skills to implement a full scale solution.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables business users to more expeditiously build a large percentage of the application using a tool that targets the persona of the business user and generates requirements for the more complex pieces such as custom data sources, custom business logic, complex data relationships, and orchestrations across multiple systems (e.g., line-of-business (LOB)). Solution templates can be provided at product distribution for common life cycle products such as development servers and project servers (e.g., Visual Studio Team Server and Microsoft Office Project Server, both by Microsoft Corporation), for example.

The architecture addresses the speed of application development by allowing the business user to iterate quickly to build the desired experience. IT may be involved only for specific and generally smaller projects without interrupting progress in the business unit development. Business units now have a means to create specific and usable requirements for IT based on real application elements ("client contract first"). "Client contract first" means that the user experience designed by the business user defines a contract for any back-end code the professional developer creates. This is what ensures uninterrupted functionality when the final solution is integrated into the system. The architecture provides a "just-enough-structure" approach to project management raising the overall agility between the business unit and IT interactions.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
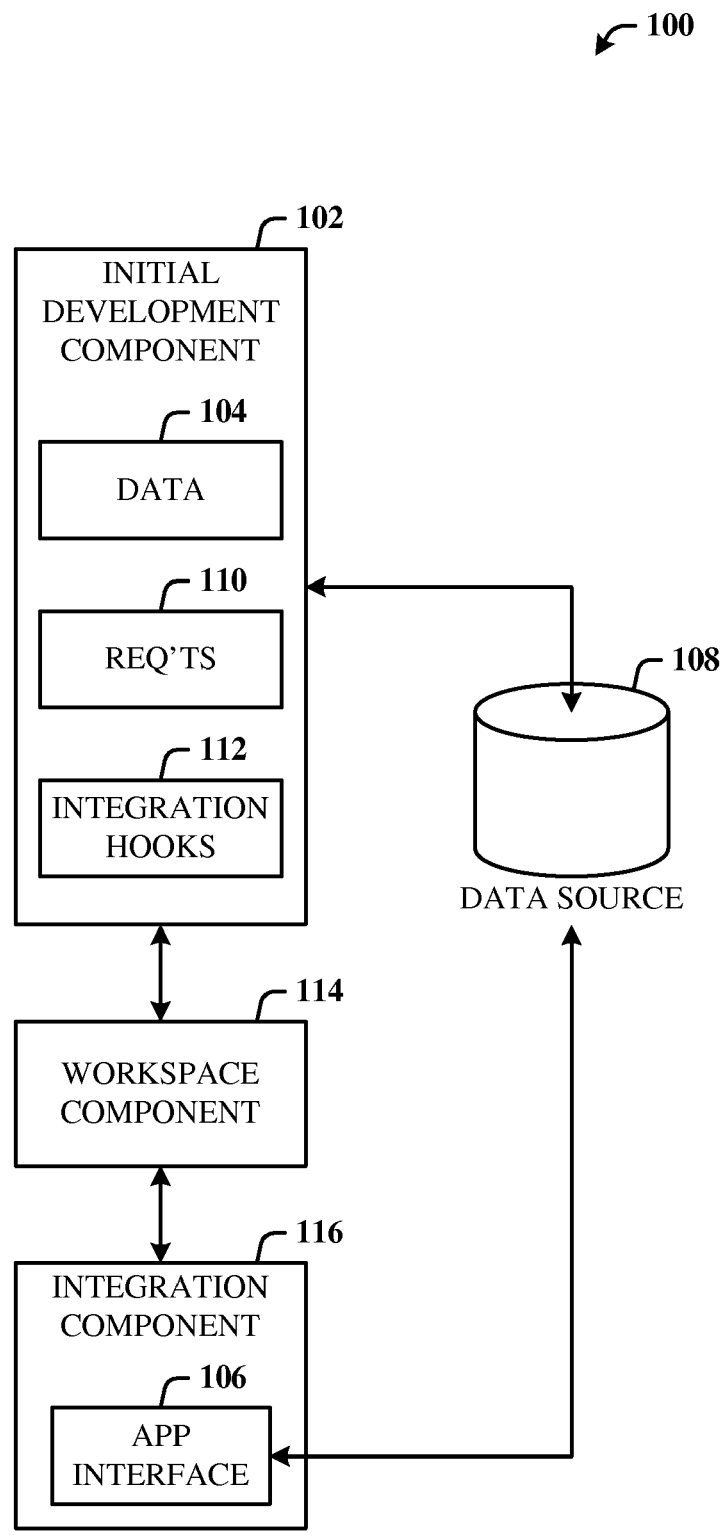
FIG. 1 illustrates a computer-implemented system for application development.

The disclosed architecture facilitates the generation of requirements from real application components, the generation of integration hooks from real and mockup data, zero-impact reintegration of custom data sources, the simple integration of other custom components, configurable process/workspace templates, and the simple integration with existing software development lifecycle infrastructure.

The architecture provides development tools for the occasional developer to build a substantial portion of an application interface for accessing and interacting with actual data. The lack of knowledge of the occasional developer to complete the project is then supplemented by a development service provider such that experienced developers complete the interface and integrate the interface into the application environment so the occasional developer can use the application to access data for which the interface was developed. The architecture provides tools that are understandable for building in a guided way the framework and the user experience for the application, and then passes on the more complex pieces to IT because coding may be needed or a model should be generated that is scalable for a large number of users, for example. IT then completes the development process and integrates the final solution into the application environment.

Thus, the occasional developer can build dashboards and bring together web parts that are easy to understand. The occasional developer can also define lists which are a construct that is well understood by users (e.g., business) in spreadsheets and collaboration applications, for example. The front line occasional developer knows what the data looks, what the user wants and where the data can be obtained. The data sources can be line-of-business (LOB) sources, SQL sources, etc. The architecture provides the tools to define that data structure and connect to those data sources. In some cases the data sources do not yet exist, however, the developer can still define the list and the format desired to view the data. The developer can provide sample data and send that data as a prototype for further application development.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented system 100 for application development. The system 100 includes an initial development component 102 for developing data 104 (e.g., real usable data or prototype (mockup or mock) data) for an application interface (or application) 106 to be developed and deployed. The data 104 can be generated by an occasional developer (also referred to as a novice developer) and/or obtained from an actual data source 108 (e.g., LOB, SQL, backend system, etc.). The novice developer can then initiate generation of a requirements document 110 and software integration hooks 112 based on the data 104.

A workspace component 114 of the system 100 receives and exposes the data 104, requirements information 110, and integration hooks 112 to a development service provider that typically include experienced developers for integration processing. An integration component 116 facilitates the integration processing and finalization of the application interface 106 based in part on the data 104, requirements information 110, and/or integration hooks 112. In other words, the integration component 116 can be employed for finalizing the application interface 106 by integrating components developed by the development service provider based in part on the requirements information 110.

The workspace component 114 is generated based on a configurable template. The workspace component 114 can be a single shared workspace generated based on the configurable template from an out-of-the-box library of templates. Alternatively, the workspace component 114 can be a collaboration application that facilitates the creation of the single workspace via which the novice developer passes initial development information (e.g., data 104, requirements 110 and/or integration hooks 112) to the developer service provider for completion of the desired application and/or application interface 106.

Design collaboration can be managed from the shared workspace. The workspace can include team member management such as preconfigured groups (e.g., development, test, administrator, user, etc.), software development lifecycle workflows (e.g., bug tracking, etc.), and links to relevant libraries for design artifacts (e.g., entities, lists/business data lists, forms, workflow orchestrations, etc.).

The requirements information is used to generate a workflow to the development service provider via the workspace component 114. The workspace component 114 includes the initial artifacts from the initial development component 102, team management information, and a user interface (e.g., app interface 106). The workspace component 114 can be linked to a project management system and source control system, although this is not a requirement. The integration component 116 can implement the application interface (e.g., API) to the actual data source 108.

Figure 2:
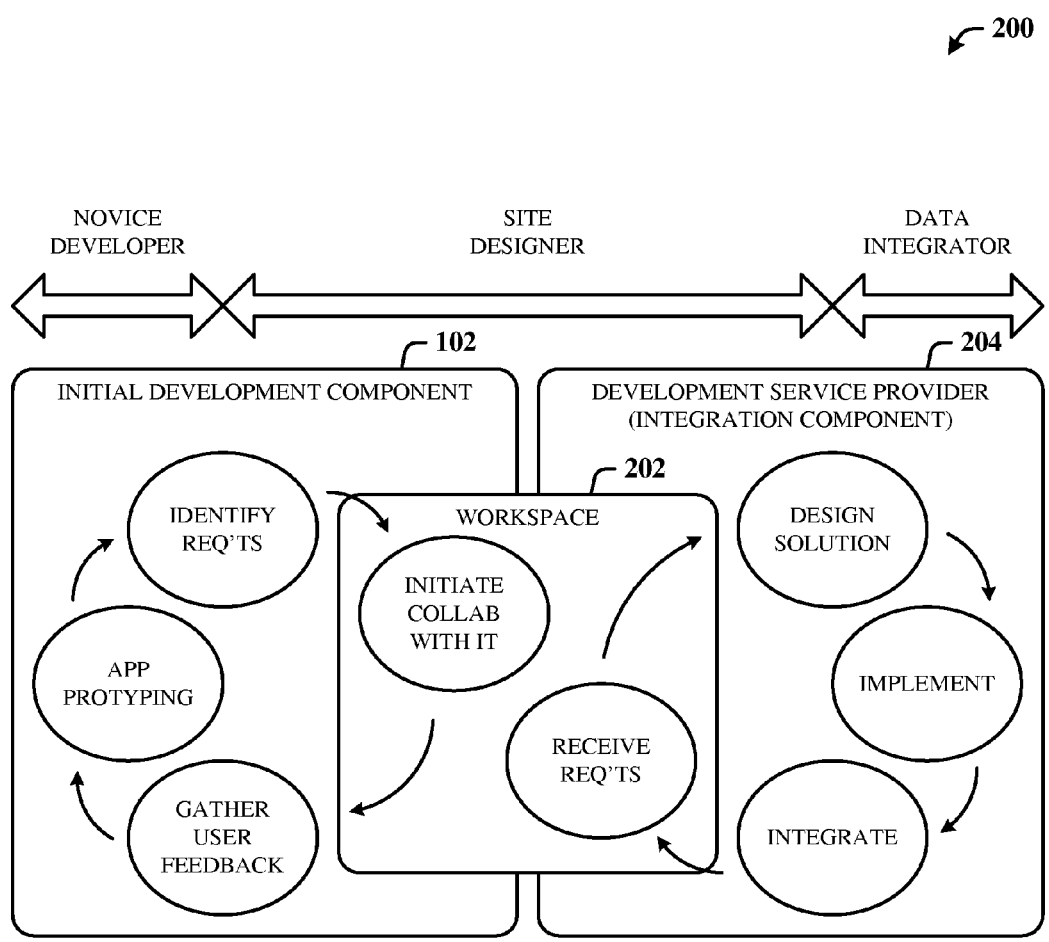
FIG. 2 illustrates a framework that facilitates creation of a user experience by a novice developer and completion of the remaining development by an experienced developer.

FIG. 2 illustrates a framework 200 that facilitates the user experience (UX) by the novice developer (e.g., field consultant, frontline user, etc.) to provide most of the upfront development work and then turns over the remaining (and typically more complicated) development to an experienced (backend) developer. The UX developer and backend developer (or integrator) can work independently without disruption.

The process begins with the initial development component 102 where the novice developer gathers user feedback, performs application prototyping (also referred to as rapid application development) using mockup (or real) data and then identifies requirements information. The novice developer then selects one or more configurable templates, and based on this selection, the requirements information and the integration hooks are generated and a workspace 202 created via which collaboration can be initiated with the central IT group such as for passing the initial development information (e.g., mockup data, requirements, etc.). The result of the iterations in the initial development component 102 is a working, usable application built by the business user/novice developer. The requirements are passed from the workspace 202 to a development service provider 204 for design solutions, implementation and integration into the actual application environment.

The hand-off and integration processes are facilitated by the framework 200. In other words, the novice developer creates functional application and user interface, for example, except for the more complex backend integration. The novice developer can hand-off parts of the application design to the backend developer without losing functionality. The backend integrator implements the missing functionality independently and reintegrates the missing functionality into the solution when ready. Deployment can be to a test team or a production team, for example.

Design collaboration can be managed from the shared workspace 202. The workspace 202 can include team member management such as preconfigured groups (e.g., development, test, administrator, user, etc.), software development lifecycle workflows (e.g., bug tracking, etc.), and links to relevant libraries for design artifacts (e.g., entities, lists/business data lists, forms, workflow orchestrations, etc.).

The design process can occur via the shared workspace where the UX developer hands off the frontend work to the designer. Creation of the workspace 202 is optional, however. A basic method of design includes sending an email to the IT Group with instructions links to relevant objects. A medium method includes creation of the workspace 202 via which all subsequent work is done. A multi-step approach can include creating a request in a list and the IT Group creates the workspace 202 from the list for approved requests.

Figure 3:
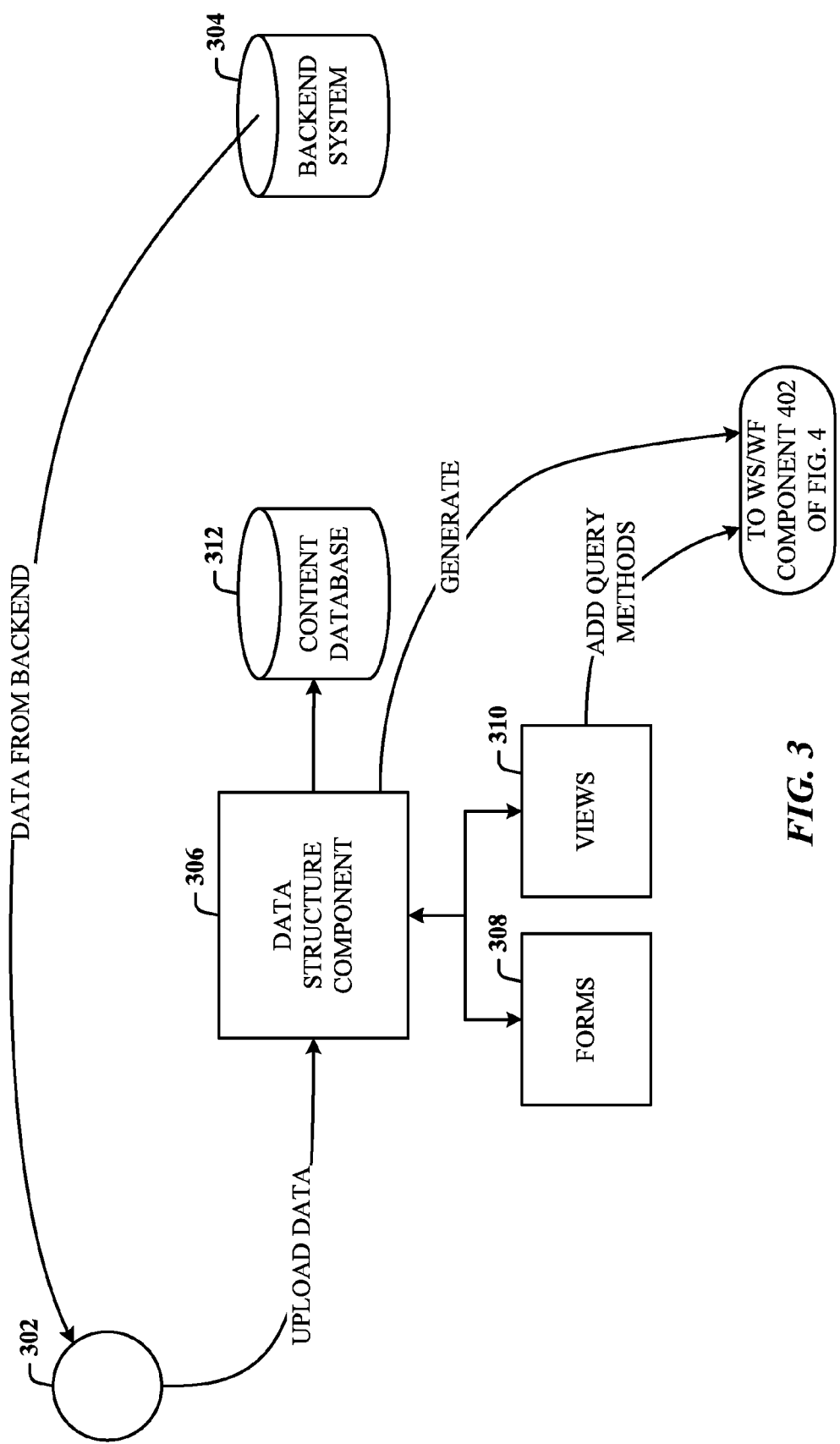
FIG. 3 illustrates one or more processes related to the initial development environment.
Figure 4:
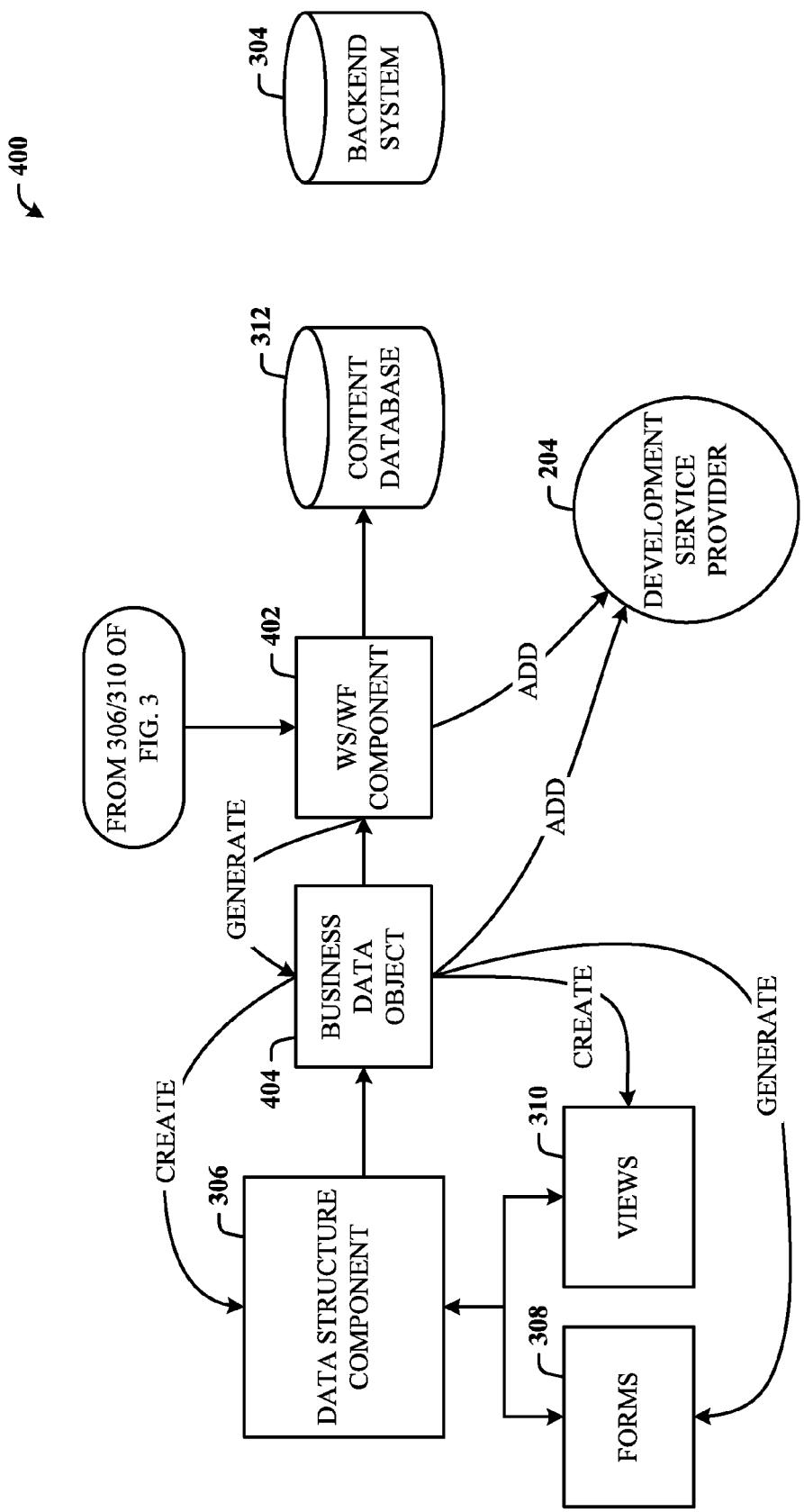
FIG. 4 illustrates one or more processes related to the designer aspects via the workspace that provides access to the developer service provider.
Figure 5:
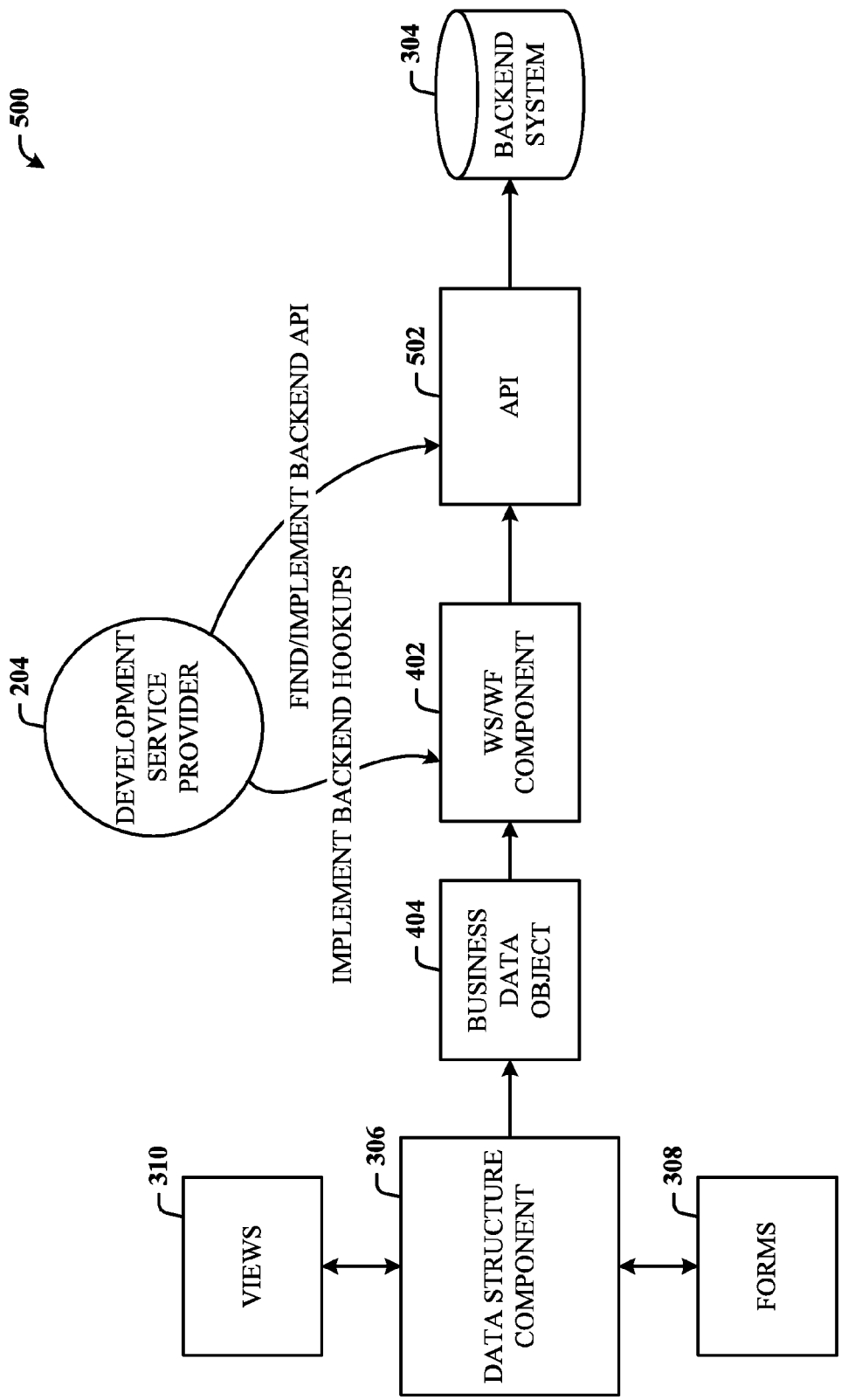
FIG. 5 illustrates the integration processes for finalizing the requirements and integration hookups originating from the novice developer.

FIGS. 3-5 illustrate more detailed diagrams for data and processes related to the initial development component, workspace component, and integration component. FIG. 3 illustrates one or more processes related to the initial development environment 300. The novice developer creates a dataset 302 (e.g., mockup, real), which can include selecting a subset of data from a backend system 304 or crafting the dataset 302 separately or in part from data of the backend system 304. The backend system 304 can be a business system (e.g., LOB, SQL) or another external database or a web service. Once created, the dataset 302 is uploaded to a data structure component 306 where the dataset 302 can be structured (e.g., a list) using rows and/or columns, data types, and entering data, for example. From the structure component 306 the novice developer can build one or more forms 308 and views 310 for the project and decisions, etc. Additionally, the structured data from the structure component 306 can be stored in a content database 312. The content database 312 is the database behind a collaboration server (e.g., web-based) that contains the data for the application built by the developer team.

The structured data and views 310 are passed to generate workflow requirements at FIG. 4. FIG. 4 illustrates one or more processes 400 related to the designer aspects via the workspace that provides access to the developer service provider (or integrator). The novice developer initiates collaboration, which then creates a workspace or accesses an already-created workspace via which the developer teams can access the requirements generated by the novice developer interface.

Handoff of the requirements information and integration hooks to the web service/workflow (denoted WS/WF) component 402 generates a web service interface that fits with that structured data. This is a client contract. In other words, a business user (the novice developer) defines and generates a programming interface and data structure definition (a client contract), a process unattainable in conventional systems. From the web service/workflow contract, a business data object 404 (e.g., business) and a business data catalog can be created. At this time, the data structure is virtualized. This builds a concrete dataset in such a way that the professional developer can then fill in the blanks. The virtualization process tests how the data looks to the user, only now the data is obtained in a different way. This is transparent to the user. The blanks are essentially the logic inside of the web service component 402 to get at the desired data. Query methods are derived from the views 310. In other words, the view is what results from the specific query method that was added. Multiple query methods can be added for the multiple views 310.

An entity definition from the business data object 404 and the web service interface from the WS/WF component 402 are passed to the development service provider 204 (via the shared workspace) for integration processing. FIG. 5 illustrates the integration processes 500 for finalizing the requirements and integration hookups originating from the novice developer. At this stage, the professional developer knows exactly what the novice developer expects to see. There can be some annotations or comments passed along that further explain to the professional developer what the novice developer (e.g., business user) expects to see. There can be additional features that the novice developer wants to model that can be specified and passed on to the service provider 204.

The professional developer implements the final pieces. In this case, the professional developer implements the backend hookups to the WS/WF component 402 and finds/implements the backend API 502 (similar to the app interface 106) that gets the data from the backend system 304 (e.g., a web service). This can also include the implementation inside of the web service that calls the API 502 to get the data from the backend system 304.

One particular implementation can utilize SharePoint™ products by Microsoft Corporation to derive a business solution. In the normal course of the design process using SharePoint Designer™, the novice developer creates prototypes of the data expected to be to seen, presses a button (or other selection mechanism) to generate both the needed integration hooks as well as a requirements document based on a configurable template. At this time, the novice developer can also create real data. For example, business users can create list definitions in the context the application and then begin using the real data. This initiates a workflow with the development service provider. A SharePoint workspace is created that holds all the initial artifacts, basic project management infrastructure (e.g., tasks, issues, schedules, etc.), team management, and UI for common actions such as schedule review meeting, send status updates, etc.

The workspaces are based on configurable site templates, which can be configured by the central IT department and tied into the project management and source control systems. Templates can be provided with the product distribution for commonly used software development lifecycle products.

This addresses the conventional application development bottleneck by allowing the novice business user to iterate quickly to build the desired experience. IT is involved only for specific, and generally, smaller projects without interrupting progress in the business unit development. Business units are provided a simple way to create specific and usable requirements for IT based on real application elements (client contract first). Overall, this "just-enough-structure" approach to project management raises the overall agility of business unit/IT interactions.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
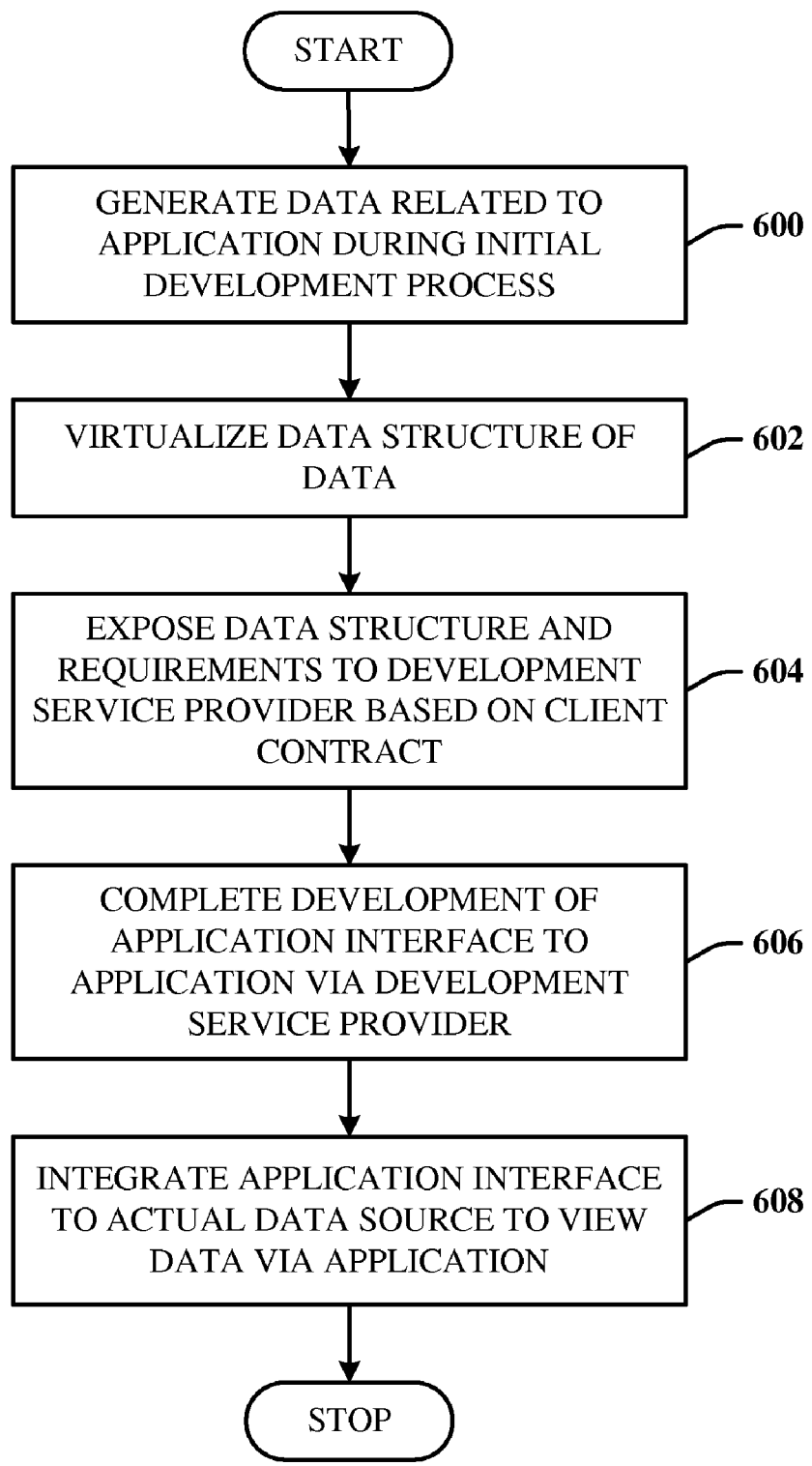
FIG. 6 illustrates a computer-implemented method of developing an application component.

FIG. 6 illustrates a computer-implemented method of developing an application component. At 600, data related to an application during an initial development process is generated. At 602, a data structure of the data is virtualized. At 604, the data structure and requirements are exposed to a development service provider based on a client contract. At 606, development of an application interface to the application is completed via the development service provider. At 608, the application interface is integrated to an actual data source to view data via the application.

The method can further include defining the mock data by columns and rows, initiating a workflow with the development service provider via a shared workspace that exposes the data structure and the requirements, creating the workspace in response to processing of a configurable template, integrating the data structure and the requirements with a software development lifecycle infrastructure for completion of the application interface, and generating integration hooks based on a configurable template. The shared workspace facilitates receiving and exposing at least one of design artifacts from the initial development process, project management infrastructure, team management information, or a user interface for common actions.

Figure 7:
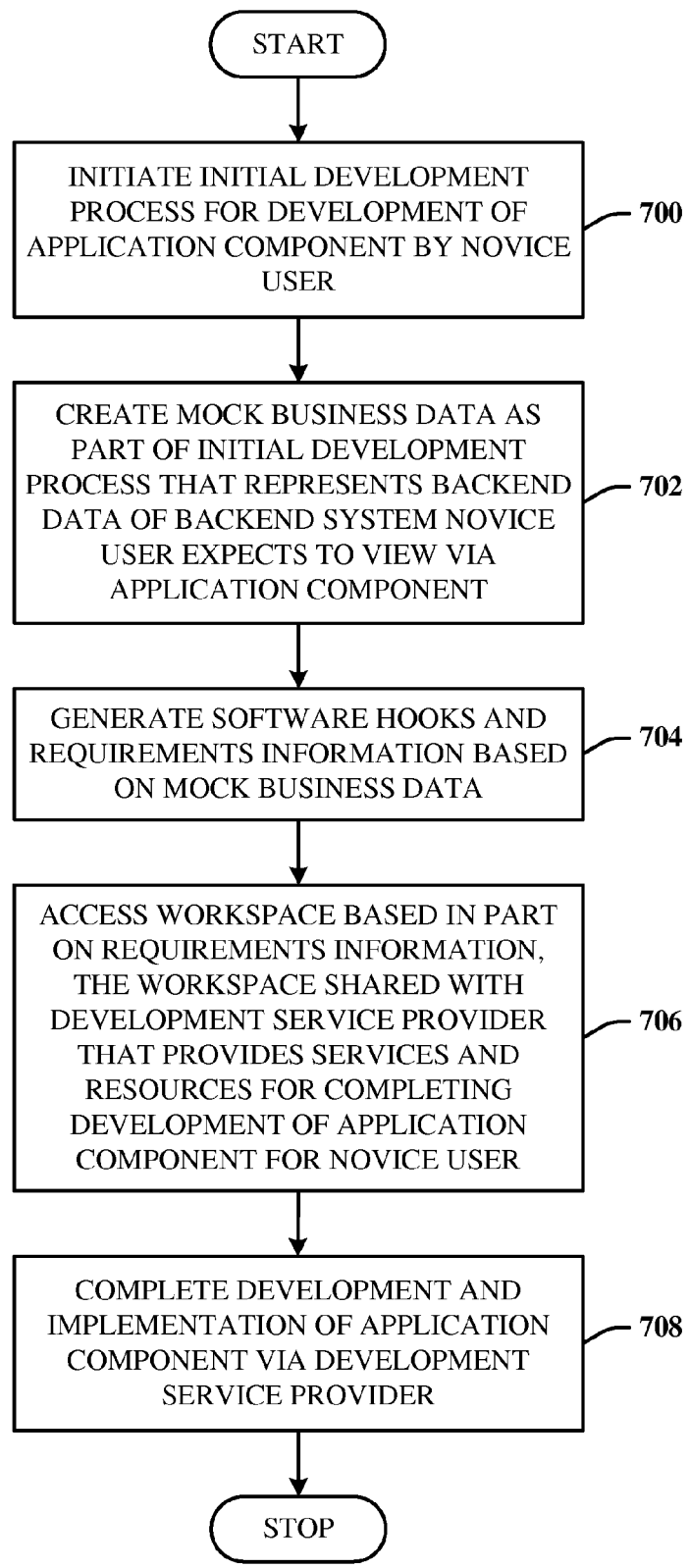
FIG. 7 illustrates a computer-implemented method of developing an application component.

FIG. 7 illustrates a computer-implemented method of developing an application component. At 700, an initial development process is initiated for development of an application component by a novice user. At 702, mock business data is created as part of the initial development process that represents backend data of a backend system the novice user expects to view via the application component. At 704, software hooks and requirements information are generated based on the mock business data. At 706, a workspace is accessed based in part on the requirements information, the workspace shared with a development service provider that provides services and resources for completing development of the application component for the novice user. At 708, development and implementation of the application component is completed via the development service provider.

This method can further include implementing the software hooks to the backend system and implementing the application component as a program interface to the backend system for the novice user, creating a business data object from which forms and views are generated, adding query methods based on the views and, creating a web service and implementing the software hooks in the web service for calling the application component the retrieve the backend data from the backend system.

The disclosed architecture includes a UI via which the novice developer (user) can initiate the initial development process, the handoff to the integration services can be accomplished and the professional developers can complete and implement the final product for the novice developer. For example, if the novice user desires to develop a business interface to one or more business data sources for the user's PIM (personal information manager) application (e.g., Outlook™ by Microsoft Corporation), the novice user can accomplish this using the disclosed architecture. The UI facilitates the selection of lists, document libraries and business data lists and data sources, for example. The UI allows the novice user to select business data fields from existing actual data sources for generation of the application component (e.g., API). The data sources include SQL server tables, web service entities, list, relational database tables, etc. The UI further provides links to objects and project documentation, lists current issues, and present project milestones for larger integration projects, for example.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 8:
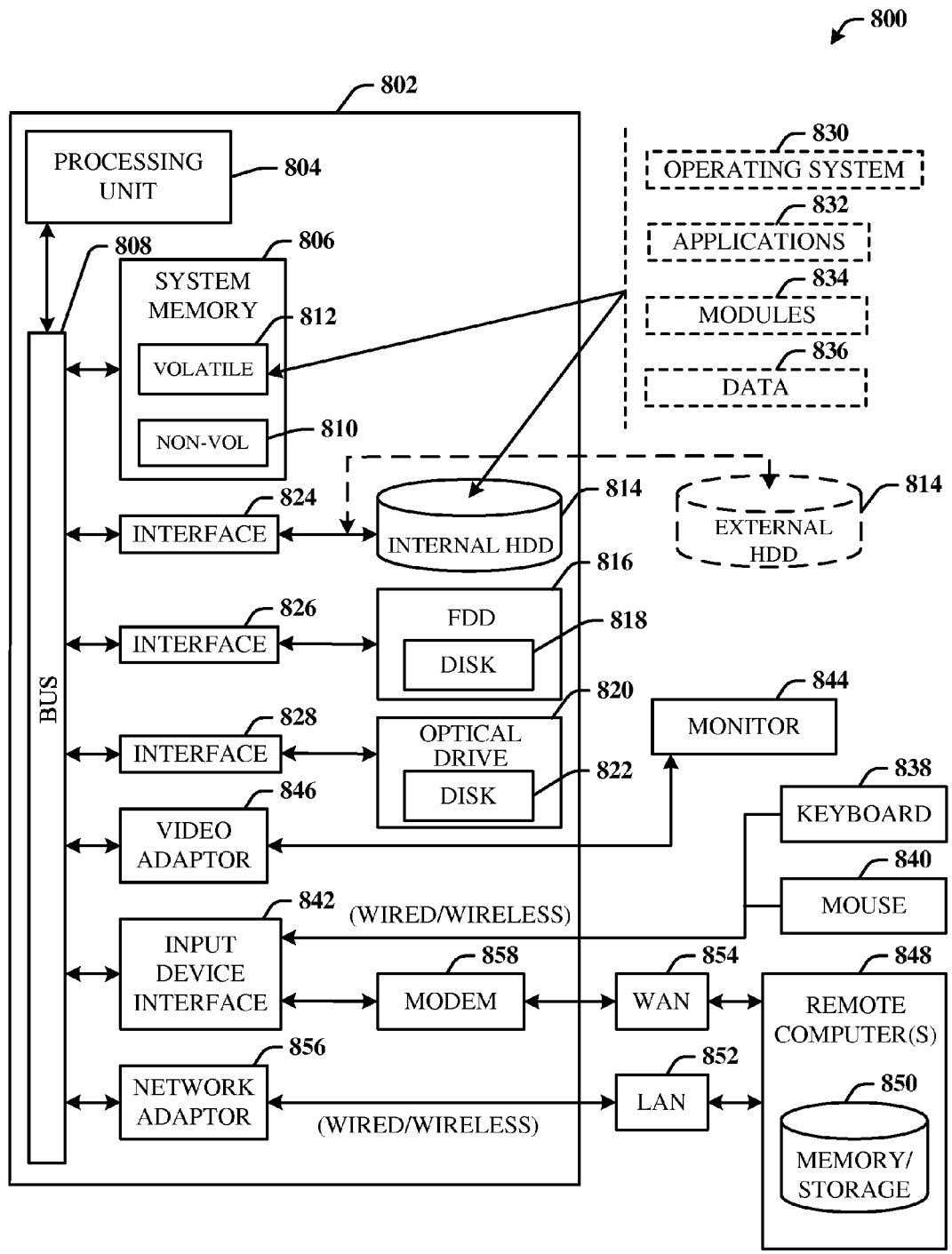
FIG. 8 illustrates a block diagram of a computing system operable to execute prototype upgrading to full scale solutions in accordance with the disclosed architecture.

Referring now to FIG. 8, there is illustrated a block diagram of a computing system 800 operable to execute prototype upgrading to full scale solutions in accordance with the disclosed architecture. In order to provide additional context for various aspects thereof, FIG. 8 and the following discussion are intended to provide a brief, general description of a suitable computing system 800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary computing system 800 for implementing various aspects includes a computer 802 having a processing unit 804, a system memory 806 and a system bus 808. The system bus 808 provides an interface for system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 can include non-volatile memory (NON-VOL) 810 and/or volatile memory 812 (e.g., random access memory (RAM)). A basic input/output system (BIOS) can be stored in the non-volatile memory 810 (e.g., ROM, EPROM, EEPROM, etc.), which BIOS are the basic routines that help to transfer information between elements within the computer 802, such as during start-up. The volatile memory 812 can also include a high-speed RAM such as static RAM for caching data.

The computer 802 further includes an internal hard disk drive (HDD) 814 (e.g., EIDE, SATA), which internal HDD 814 may also be configured for external use in a suitable chassis, a magnetic floppy disk drive (FDD) 816, (e.g., to read from or write to a removable diskette 818) and an optical disk drive 820, (e.g., reading a CD-ROM disk 822 or, to read from or write to other high capacity optical media such as a DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 812, including an operating system 830, one or more application programs 832, other program modules 834, and program data 836. The computer 802 can be employed as a client system and/or a server system. The one or more application programs 832, other program modules 834, and program data 836 can include the initial development component 102, data 104, requirements 110, integration hooks 112, workspace component 114, integration component 116 and app interface 106, workspace 202, development service provider 204, and so on. These also include the processes 300 (and components), processes 400 (and components), and processes 500 (and components), for example.

All or portions of the operating system, applications, modules, and/or data can also be cached in the volatile memory 812. It is to be appreciated that the disclosed architecture can be implemented with various commercially available operating systems or combinations of operating systems.

A user can enter commands and information into the computer 802 through one or more wire/wireless input devices, for example, a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, etc.

A monitor 844 or other type of display device is also connected to the system bus 808 via an interface, such as a video adaptor 846. In addition to the monitor 844, a computer typically includes other peripheral output devices (not shown), such as speakers, printers, etc.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, is connected to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
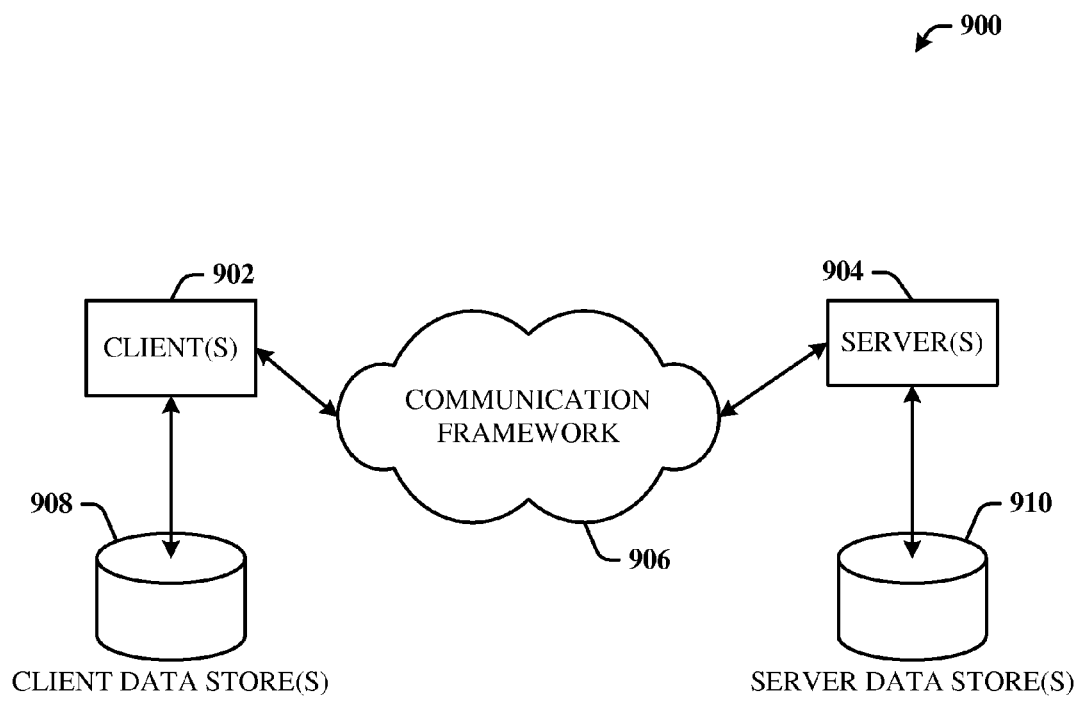
FIG. 9 illustrates a schematic block diagram of an exemplary computing environment that supports novice and professional developer interaction for software component development in accordance with the disclosed architecture.

Referring now to FIG. 9, there is illustrated a schematic block diagram of an exemplary computing environment 900 that supports novice and professional developer interaction for software component development in accordance with the disclosed architecture. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The clients 902 can include applications for accessing the architecture, initiating the initial development process and generally interfacing to provide the mock data and requirements used to complete the novice developer project. The server data store(s) 910 can include the backend system 304 and other data systems form which the novice developer may want to extract data for mockup.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for application development, comprising:
   an initial development component for developing design data and functionality for a user application interface under development by a user that is an occasional developer, the initial development component generates requirements information and integration hooks based on prototype data;
   a workspace component for exposing the requirements information identified by the user based on the data to a development service provider comprising a developer more experienced than the occasional developer that completes the user application interface;
   an integration component for finalizing the development of the user application interface by integrating components developed by the development service provider based in part on the requirements information; and
   a processor that executes computer-executable instructions associated with at least one of the initial development component, the workspace component, or the integration component.

2. The system of claim 1, wherein the initial development component is employed to generate integration hooks based on the data, which is real data or prototype data.

3. The system of claim 1, wherein the workspace component is generated based on a configurable template.

4. The system of claim 1, wherein the requirements information is used to generate a workflow to a development service provider via the workspace component.

5. The system of claim 1, wherein the workspace component includes initial artifacts from the initial development component, team management information and a user interface.

6. The system of claim 1, wherein the workspace component is linked to at least one of a project management system, a source control system, or lifecycle tools.

7. The system of claim 1, wherein the integration component implements the user application interface to an actual data source.

8. A computer-implemented method of developing an application, comprising acts of:
   generating design data and functionality related to an application during an initial development process of the application by a user that is an occasional developer;
   virtualizing a data structure of the data;
   generating software hooks and requirements information identified by the user based on the design data as part of the initial development process;
   exposing the data structure and requirements to a development service provider based on a client contract;
   completing development of a user application interface to the application via the development service provider that comprises a developer more experienced than the occasional developer;
   integrating the user application interface to an actual data source to view data via the application; and
   utilizing a processor that executes instructions stored in memory to perform at least one of the acts of generating, virtualizing, exposing, completing, or integrating.

9. The method of claim 8, further comprising defining the data by columns and rows.

10. The method of claim 8, wherein the data structure and requirements are exposed to the development service provider via a shared workspace that receives and exposes at least one of design artifacts from the initial development process, project management infrastructure, team management information, or a user interface for common actions.

11. The method of claim 8, further comprising initiating a workflow with the development service provider via a shared workspace that exposes the data structure and the requirements.

12. The method of claim 8, further comprising creating a shared workspace in response to processing of a configurable template.

13. The method of claim 8, further comprising integrating the data structure and the requirements with a software development lifecycle infrastructure for completion of the application interface.

14. The method of claim 8, further comprising generating integration hooks based on a configurable template.

15. A computer-implemented method of developing an application component, comprising acts of:
   initiating an initial development process for development of an application component by a user that is an occasional developer;
   creating mock business data as part of the initial development process by the user that represents backend data of a backend system the user expects to view via the user application component;
   generating software hooks and requirements information identified by the user based on the mock business data as part of the initial development process;
   accessing a workspace based in part on the requirements information, the workspace shared with a development service provider that includes developers more experienced than the occasional developer and that provides services and resources for completing development of the application component for the user;
   completing development and implementation of the application component via the development service provider; and
   utilizing a processor that executes instructions stored in memory to perform at least one of the acts of initiating, creating, generating, accessing, or completing.

16. The method of claim 15, further comprising implementing the software hooks to the backend system and implementing the application component as a program interface to the backend system for the user.

17. The method of claim 15, further comprising creating a business data object from which forms and views are generated.

18. The method of claim 17, further comprising adding query methods based on the views.

19. The method of claim 15, further comprising creating a web service and implementing the software hooks in the web service for calling the application component to retrieve the backend data from the backend system.

* * * * *